J. FLAMMANG.
PISTON.
APPLICATION FILED SEPT. 16, 1918.
1,363,725.
Patented Dec. 28, 1920.
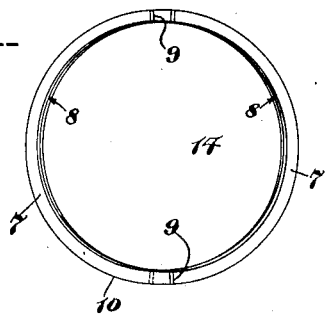
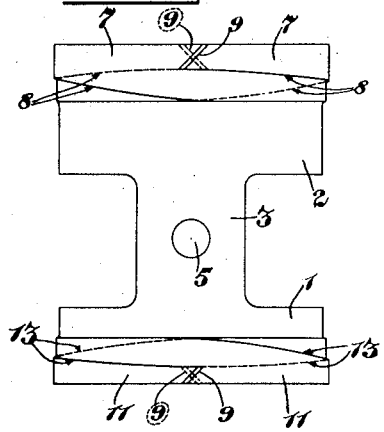
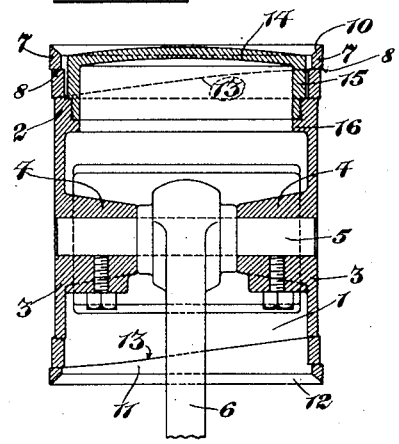
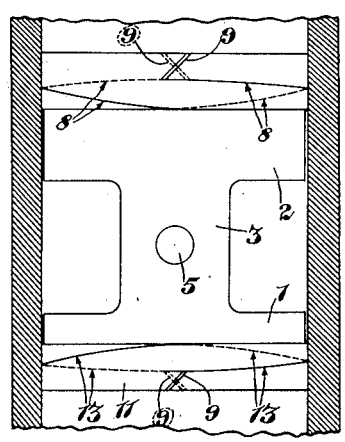
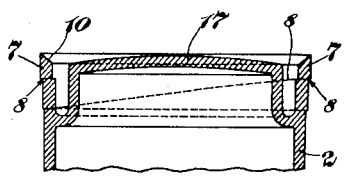
Attest
Charles A. Becker
Inventor
John Flammang
By Rippey & Kingsland
His Attorneys

UNITED STATES PATENT OFFICE.

JOHN FLAMMANG, OF UNIVERSITY CITY, MISSOURI, ASSIGNOR TO OTTMAR G. STARK, OF ST. LOUIS, MISSOURI.

PISTON.

1,363,725.     Specification of Letters Patent.     Patented Dec. 28, 1920.

Application filed September 16, 1918. Serial No. 254,178.

*To all whom it may concern:*

Be it known that I, JOHN FLAMMANG, a citizen of the United States, residing at University City, St. Louis county, Missouri, have invented new and useful Pistons, of which the following is a specification.

This invention relates to pistons.

An object of the invention is to provide a piston for engines, pumps and the like, which will maintain close sealing contact with the wall of the cylinder in which it is mounted and which does not require the presence or use of separate piston rings, packing or other elements to prevent the passage of the gas, steam or liquid between the piston and the cylinder wall.

Another object is to provide a piston comprising a piston body and a piston head in connection with the body, and means supported by the piston body for maintaining close contact with the wall of the cylinder in which the piston is mounted to prevent the passage of gas, steam or fluid between the piston and the wall of the cylinder.

Another object of the invention is to provide a piston comprising a piston body having ring segments in connection therewith arranged to press against the cylinder wall and maintain close contact to prevent the passage of gas, steam or fluid, and a head in connection with the piston body within the ring segments.

A further object is to provide a piston of novel and efficient construction which will operate without the use of piston rings or packing.

Other objects will appear from the following description, without specific mention. In the drawing, Figure 1 is a plan view of my improved piston.

Fig. 2 is a side elevation.

Fig. 3 is a vertical sectional view.

Fig. 4 is a view illustrating a piston mounted within a cylinder.

Fig. 5 is a view illustrating a modified construction in which the piston head is integral with the piston body instead of being detachable therefrom as illustrated in Fig. 3.

The piston illustrated comprises a body which may be of any appropriate form but is preferably composed of a lower ring 1, an upper ring 2 and connections 3 integrally uniting the upper and lower rings. While this is illustrated as a preferred form it will be apparent from the following description that the form of the piston body may be varied and, if desired, may include the usual cylindrical form. The connections 3 have bosses 4 provided with holes for receiving and supporting the wrist pin 5 with which the piston rod 6 is connected.

The upper end of the piston body is provided with a pair of ring segments 7 formed by splitting the piston body along spiral cuts as shown at 8. From the upper end of each of the cuts 8 a cut 9 is formed to the upper end of the piston body, thus leaving the two ring segments free for expansion and contraction. As shown in Fig. 4 the main portion of the piston body is of slightly less diameter than the diameter of the cylinder in which it is intended to operate, whereas the ring segments in connection with the piston body press closely against the cylinder to prevent the passage of gas, steam or fluid between the piston and the wall of the cylinder. If the entire piston body is originally of less diameter than the cylinder in which the piston is intended to operate the ring segments are expanded by pressure applied thereto in any known or appropriate manner to a diameter larger than the diameter of the body of the piston and also larger than the diameter of the cylinder in which it is intended to use the finished piston. The ring segments are then set in their expanded shape by being subjected to heat until their molecular construction is changed and the material is set. This leaves the resilient ring segments of larger diameter than the diameter of the cylinder in which the piston is to be used so that when the piston is placed in the cylinder it is necessary to compress the ring segments as a result of which the ring segments impart pressure against the cylinder wall throughout the circumference of the piston and thus prevent the passage of gas, steam or fluid between the piston and the cylinder.

The cuts 9 are preferably inclined in order to leave the ends of the ring segments with an interlock to strengthen them and prevent breaking in the operation of the piston. The upper edges of the ring segments are beveled as shown at 10 to enable the force of the compression and the explosion to press the segments closely against the cylinder walls.

The lower portion of the piston body is provided with similar ring segments 11 which are formed by spiral cuts 13 and which operate the same as the segments 7 to impart pressure against the wall of the cylinder. The lower edges of the ring segments 11 are beveled to provide scraping edges 12 for scraping the oil from the cylinder wall during downward movement of the piston, and to enable the oil to flow from the piston to the cylinder wall during upward movement of the piston.

As shown each of the spiral cuts 8 and 13 extends about one-half of the circumference of the piston, though it is apparent that the construction may be varied in this particular and that the cuts may be made of greater or less length, as desired.

In the construction illustrated in Fig. 3 the head or top of the piston is removable. As shown the head includes an upwardly convexed wall 14 and a tubular portion 15 exteriorly threaded at its lower end and having threaded engagement within the upper portion of the cylinder body. The tubular portion is shouldered above the threads as shown in Fig. 3, the shoulder being arranged to bear against the upper end of the cylinder body while the lower end of the threaded portion rests upon a shoulder or flange 16 within the cylinder body, thus strengthening and supporting the head in connection with the body of the piston. The head thus arranged is removable and may be readily detached for replacement in case of damage. The upper surface of the head may be arranged in any desired or appropriate relation to the upper edges of the ring segments. In the construction shown the upper surface of the head is in a plane slightly below the plane of the upper edges of the ring segments. The head fits relatively close to the compressed ring segments in order to avoid losing compression space.

The principal difference between the construction shown in Fig. 5 and that shown in Fig. 3 is in the formation of the head of the piston. In the construction shown in Fig. 5 the head 17 is integral with the piston body, being spaced slightly from the ring segments in order to allow free movement of the segments in expanding and contracting and to enable the explosive force in the space between the head and the ring segments to force the segments close against the cylinder wall. Except for the provision of the head 17 in integral connection with the piston body the remainder of the piston is the same as that previously described and similar reference numerals are applied to the same parts.

I claim:

1. A piston, comprising a body of less diameter than the diameter of the cylinder for which the piston is intended, and resilient segmental sections separated from the piston body along circumferential lines, integrally united with opposite ends of the piston body and arranged to bear against the wall of the cylinder and thereby retain the piston body in proper alinement and out of contact with the wall of the cylinder.

2. A piston, comprising a body of less diameter than the diameter of the cylinder for which the piston is intended, resilient segmental portions separated from the piston body along spiral circumferential lines, integrally united with opposite ends of the piston body and arranged to bear against the wall of the cylinder and thereby retain the piston body in proper relation to the wall of the cylinder, and a piston head in connection with the piston body.

3. A piston, comprising a body of less diameter than the diameter of the cylinder for which the piston is intended, resilient segmental portions separated from the piston body along spiral circumferential lines, integrally united with opposite ends of the piston body and arranged to bear against the wall of the cylinder and thereby retain the piston body in proper relation to the wall of the cylinder, and a piston head removably supported in connection with the piston body.

4. A piston, comprising a piston body of smaller diameter than the diameter of the cylinder for which it is intended, resilient segmental portions integrally united with opposite ends of the piston body arranged to bear against the wall of the cylinder and thereby retain the piston body in proper alinement and out of contact with the wall of the cylinder, and a piston head encircled by the segmental portions at the upper end of the piston.

5. A piston, comprising a piston body of smaller diameter than the diameter of the cylinder for which it is intended, resilient segmental portions integrally united with opposite ends of the piston body arranged to bear against the wall of the cylinder and thereby retain the piston body in proper alinement and out of contact with the wall of the cylinder, and a piston head removably supported and encircled by the segmental portions at the top of the piston.

6. A piston, comprising a piston body, a piston head in connection with the piston body, and resilient segmental portions integrally united with the upper end of the piston body and arranged to bear against the cylinder wall and having their upper edges beveled for the purpose described, said segmental portions being of increasing width from their ends to their connection with the piston body.

7. A piston, comprising a piston body, a piston head in connection with the piston body, resilient segmental portions separated from the piston body along spiral circumferential lines, integrally united with the upper end of the piston body and arranged to bear against the cylinder wall, said segmental portions having their upper edges beveled, and resilient segmental portions separated from the piston body along spiral circumferential lines, integrally united with the lower end of the piston body and arranged to bear against the cylinder wall.

8. A piston, comprising a piston body, a piston head in connection with the piston body, resilient segmental portions separated from the piston body along spiral circumferential lines, integrally united with the upper end of the piston body and arranged to bear against the cylinder wall, said segmental portions having their upper edges beveled, and resilient segmental portions separated from the piston body along spiral circumferential lines, integrally united with the lower end of the piston body and arranged to bear against the cylinder wall, and having their lower edges beveled for the purpose described.

9. A piston, comprising a piston body having its upper end split in long spiral planes forming spiral segmental portions of increasing width from their ends arranged to press against the wall of the cylinder by the resiliency of the material of said portions, and a piston head encircled by the segmental portions.

10. A piston, comprising a piston body having its upper end split in long spiral planes forming spiral segmental portions of increasing width from their ends arranged to press against the wall of the cylinder by the resiliency of the material of said portions, a piston head located within and surrounded by the segmental portions, and means for supporting the piston head in detachable connection with the piston body.

11. A piston, comprising a piston body composed of a lower ring, an upper ring, and connections integrally uniting the upper and lower rings; in combination with segmental portions in connection with the upper ring of larger radius than the upper ring arranged to bear against the wall of the cylinder, a piston head supported by the upper ring, and segmental portions in connection with the lower ring of larger radius than the lower ring arranged to bear against the wall of the cylinder.

12. A piston, comprising a piston body composed of a lower ring, an upper ring, and connections integrally uniting the lower and upper rings; in combination with segmental portions in connection with the upper ring of larger radius than the radius of the upper ring arranged to bear against the cylinder wall and having their upper edges beveled; segmental portions in connection with the lower ring of larger radius than the radius of the lower ring arranged to bear against the cylinder wall and having their lower edges beveled to scrape the oil from the cylinder wall during downward movement of the piston; and a piston head supported by the piston body.

JOHN FLAMMANG.